(12) United States Patent
Vosse

(10) Patent No.: US 9,915,255 B2
(45) Date of Patent: Mar. 13, 2018

(54) COMPRESSOR

(71) Applicant: WABCO GmbH, Hannover (DE)

(72) Inventor: Heribert Vosse, Ronnenberg (DE)

(73) Assignee: WABCO GmbH, Hannover (DE)

( * ) Notice: Subject to any disclaimer, the term of this patent is extended or adjusted under 35 U.S.C. 154(b) by 224 days.

(21) Appl. No.: 14/916,209

(22) PCT Filed: Jun. 18, 2014

(86) PCT No.: PCT/EP2014/001665
§ 371 (c)(1),
(2) Date: Mar. 3, 2016

(87) PCT Pub. No.: WO2015/036065
PCT Pub. Date: Mar. 19, 2015

(65) Prior Publication Data
US 2017/0321680 A1      Nov. 9, 2017

(30) Foreign Application Priority Data

Sep. 11, 2013  (DE) .......................... 10 2013 051 158

(51) Int. Cl.
*F16K 3/04*      (2006.01)
*F04B 39/10*     (2006.01)
(Continued)

(52) U.S. Cl.
CPC ........ *F04B 39/1073* (2013.01); *F04B 7/0046* (2013.01); *F04B 49/035* (2013.01);
(Continued)

(58) Field of Classification Search
CPC .. F04B 39/1073; F04B 7/0046; F04B 49/035; F16K 15/181; F16K 15/16; F16K 3/04
(Continued)

(56) References Cited

U.S. PATENT DOCUMENTS 4,932,631 A * 6/1990 Heger ..................... F04B 39/08
                                                                251/228
5,101,857 A * 4/1992 Heger ................. F04B 39/1086
                                                              137/601.15
(Continued)

FOREIGN PATENT DOCUMENTS

DE        3329790 A1    2/1985
DE        3909531 A1    6/1990
(Continued)

OTHER PUBLICATIONS

Euoprean Patent Office, Rijswijk, Netherlands, International Search Report of International Patent Application No. PCT/EP2014/001665, dated Nov. 3, 2014, 3 pages.

*Primary Examiner* — John Bastianelli
(74) *Attorney, Agent, or Firm* — Brinks Gilson & Lione

(57) ABSTRACT

A compressor (10) for compressing air for a compressed air system of a motor vehicle has a cylinder housing (14) and a cylinder head (16) connected thereto. A compressor piston is moveable in oscillation up and down in a cylinder in the cylinder housing (14). A lamella (34, 36) is received in a depression (38) in an underside (30) of the cylinder head (16) facing the compressor piston. The delivery rate of the compressor (10) can be regulated by closing or opening a control channel (60, 60') in the cylinder head (16) via the lamella. A bearing end (44) of the lamella (34, 36) is hinged in a pivotably guided manner on a bearing contour (54) of this depression (38). As a result, a separate bearing journal for pivotable mounting of the lamella (34, 36) on the cylinder head (16) may be omitted.

9 Claims, 3 Drawing Sheets

(51) Int. Cl.
  *F04B 49/035*  (2006.01)
  *F04B 7/00*  (2006.01)
  *F16K 15/16*  (2006.01)
  *F16K 15/18*  (2006.01)

(52) U.S. Cl.
  CPC ................ F16K 3/04 (2013.01); F16K 15/16 (2013.01); F16K 15/181 (2013.01)

(58) Field of Classification Search
  USPC ........ 251/298–301, 228; 137/599.01, 601.15
  See application file for complete search history.

(56) References Cited

U.S. PATENT DOCUMENTS

| | | | | |
|---|---|---|---|---|
| 5,327,932 | A | * | 7/1994 | Rozek ................ F04B 39/1073 137/512.15 |
| 5,456,287 | A | | 10/1995 | Leu |
| 5,980,219 | A | * | 11/1999 | Spurny ................ F04B 49/243 417/296 |
| 2013/0092019 | A1 | | 4/2013 | Pai et al. |

FOREIGN PATENT DOCUMENTS

| | | |
|---|---|---|
| DE | 19745118 A1 | 4/1999 |
| DE | 19848217 A1 | 4/2000 |
| DE | 19902513 A1 | 7/2000 |
| EP | 0 382 921 A1 | 8/1990 |

\* cited by examiner

COMPRESSOR

TECHNICAL FIELD

The invention concerns a compressor for compressing air for a compressed air system of a motor vehicle, with a cylinder housing and a cylinder head connected thereto, wherein at least one compressor piston is moveable in oscillation up and down in at least one cylinder in the cylinder housing.

BACKGROUND

Compressors are used to compress gases of all types, and in particular to compress air for various technical applications. For example, compressors are required to provide compressed air for operating pneumatic brake systems in motor vehicles and rail vehicles. In motor vehicles, the compressors are normally driven by the internal combustion engine which is provided to drive the vehicle. Where necessary, a secondary drive independent of the internal combustion engine may be provided for the compressor.

DE 198 48 217 A1 describes for example a gas compressor with an additional compression chamber. In order to minimize the power consumption of the gas compressor in unloaded running, i.e. when there is little demand for compressed air by the compressed air system, the cylinder chamber is enlarged by the controlled connection of a dead space volume by means of a displaceable and/or swivelable lamella, and in this way the mechanical drive power of the compressor is reduced in unloaded running.

In multi-cylinder compressors with pairs of pistons oscillating in opposition, it is also known to connect in each case two cylinder chambers together via a bypass channel in unloaded running, so that the compressed air is conveyed only to and fro between the cylinders, with a significant reduction in drive power. To achieve this objective, on unloaded running of the compressor, at least one bypass channel is opened at least partially by a suitable operating position of the lamellas set via actuators.

SUMMARY OF THE INVENTION

The invention is based on the object of providing a compressor for compressing a gas, which has a structurally simpler design than embodiments of compressors previously known in which the delivery rate is regulated with little loss.

The invention is based on the knowledge that the structural design of a compressor may be simplified by optimizing the mounting of the lamellas used for regulating the delivery rate with little loss, on the underside of the cylinder head.

The invention is therefore based on a compressor for compressing air for a compressed air system of a motor vehicle, with a cylinder housing and a cylinder head connected thereto, wherein at least one compressor piston is moveable in oscillation up and down in at least one cylinder in the cylinder housing. To achieve the object, it is provided that at least one lamella is received in at least one depression in an underside of the cylinder head facing the at least one compressor piston, by means of which lamella the delivery rate of the compressor can be regulated with little loss by closing or opening at least one control channel in the cylinder head, wherein a bearing end of the at least one lamella is hinged in a pivotably guided manner on a bearing contour of this depression.

Because of this design, inter alia, in comparison with a less advantageous embodiment, a bearing journal there for pivotable mounting of the lamella on the underside of the cylinder head can be omitted. In addition, at the holding structure for such a bearing journal on the cylinder head, there is now no material thickening which would otherwise be required in the direction of an adjacent flow channel. The design according to the invention allows the flow cross section of the flow channel to be enlarged, and at the same time the quantity of material necessary for production of the cylinder head to be reduced in a cost-saving manner.

In an advantageous refinement of the invention, it is proposed that the bearing end of the at least one lamella and the respective bearing contour of the assigned at least one depression in the cylinder head are formed at least partially circular. This optimizes the bearing surface created between the bearing end of the lamella and the bearing contour of the depression in the cylinder head. The outer contour of the depression, including the bearing contour for the lamella, geometrically substantially corresponds to an outer contour of this lamella in order to guarantee that it is superficially fully received in the depression.

According to a further refinement, it is proposed that the bearing end of the at least one lamella and the respective bearing contour of the at least one depression of the cylinder head engage in each other by form fit at least in regions. This gives a freely moving, yet ideally play-free mounting of the bearing end of the at least one lamella within the bearing contour of the corresponding depression in the cylinder head.

According to another embodiment, it is provided that the at least one lamella comprises an actuating portion at an actuating end directed away from the bearing end. This allows the attachment of an actuator integrated in the cylinder head, for example a small pneumatic piston-cylinder arrangement, for pivoting the lamella depending on the respective operating state of the compressor.

In a further exemplary embodiment of the actuating portion of the lamella, it is provided that, in a top view parallel to the pivot axis of the lamella, the actuating portion is formed approximately T-shaped and comprises two approximately semicircular leg ends arranged opposite each other at the short T-legs, wherein an actuating pin for mechanical coupling to an actuator is formed or attached approximately centrally between the two leg ends.

Because of the T-shaped or hammer-like design of the actuating portion of the lamella with two leg ends on the actuating side, there are two end positions of the lamella on its pivot movement, in each of which one leg end of the lamella is arranged very close to the peripheral contour of the depression in the cylinder head. Due to the T-shaped geometry of the lamella, this covers, in the region of its leg ends, an arcuate recess in the cylinder head, through which the actuating pin of the lamella passes. Said actuator for actuating the pivot movement of the lamella is arranged below the arcuate recess in the cylinder head, and is protected from the heat of the compression process and from soiling by the covering of the arcuate recess by the lamella. In another embodiment, the lamella could have an L-shaped geometry, wherein the short leg of the L covers an arcuate recess in the cylinder head.

According to a further embodiment, it is provided that, in a top view onto the lamella parallel to its pivot axis, the bearing end and the actuating portion of the at least one lamella are connected together via a valve portion which is arcuate on both sides. In this way, the valve portion of the lamella may cover and expose again control channels with a large cross section area by comparatively small pivot movements through small pivot angles.

Also, in this compressor it may be provided that, in an unloaded running operating position of the at least one lamella, the valve portion thereof at least partially opens the at least one control channel in the cylinder head. This allows an energy-saving unloaded running of the compressor. In a loaded running operating position of the at least one lamella, in contrast the valve portion completely closes the at least one control channel. Consequently, by simple pivoting of the lamella, the compressor may be switched from its unloaded running operating position to its loaded running operating position in full load operation with maximum delivery rate, with a simultaneous increase in the necessary mechanical drive power of the compressor.

Finally, it is preferably provided that the material thickness of the at least one lamella is approximately constant over its extension, and that this material thickness is smaller than the depth of the at least one depression in the underside of the cylinder head. In this way, the free movability of the lamella after assembly of the cylinder head is guaranteed in all cases.

For better understanding of the invention, drawings are enclosed with the description.

DETAILED DESCRIPTION OF THE DRAWINGS

Figure 1:
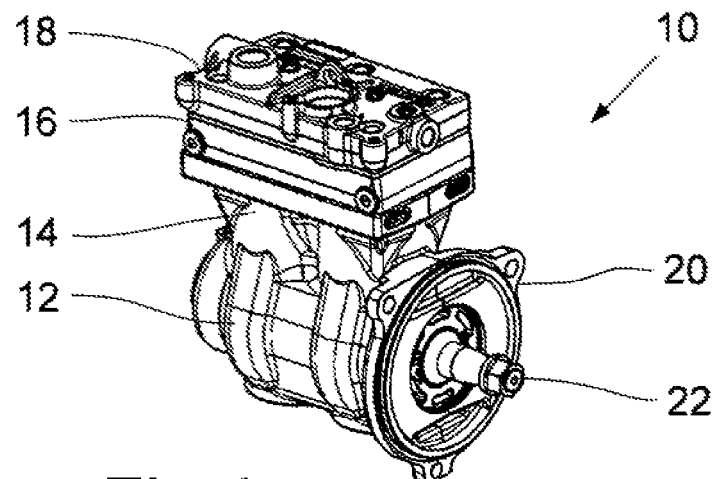
FIG. 1 shows a perspective view of a compressor with two cylinders.

In the drawings, the same structural elements carry the same reference numerals.

FIG. 1 consequently shows a two-cylinder compressor 10 for compressing gases of all types, in particular however for generating compressed air for pneumatic systems. The compressor 10 comprises amongst others a crankcase 12, a cylinder housing 14 and a cylinder head 16 placed thereon, which is in turn closed by a cylinder head cover 18. The drive shaft 22 of the compressor 10 is driven by means of a drive assembly not shown in the drawings, which can be connected to the compressor 10 via a flange 20 formed on the crankcase 12. Further technical details of the structural design of such a compressor with two cylinders, for compressing in particular air, are sufficiently well known to the skilled person active in the technical field of pneumatics, so no detailed explanation of the internal structure of the compressor 10 is given here.

Figure 2:
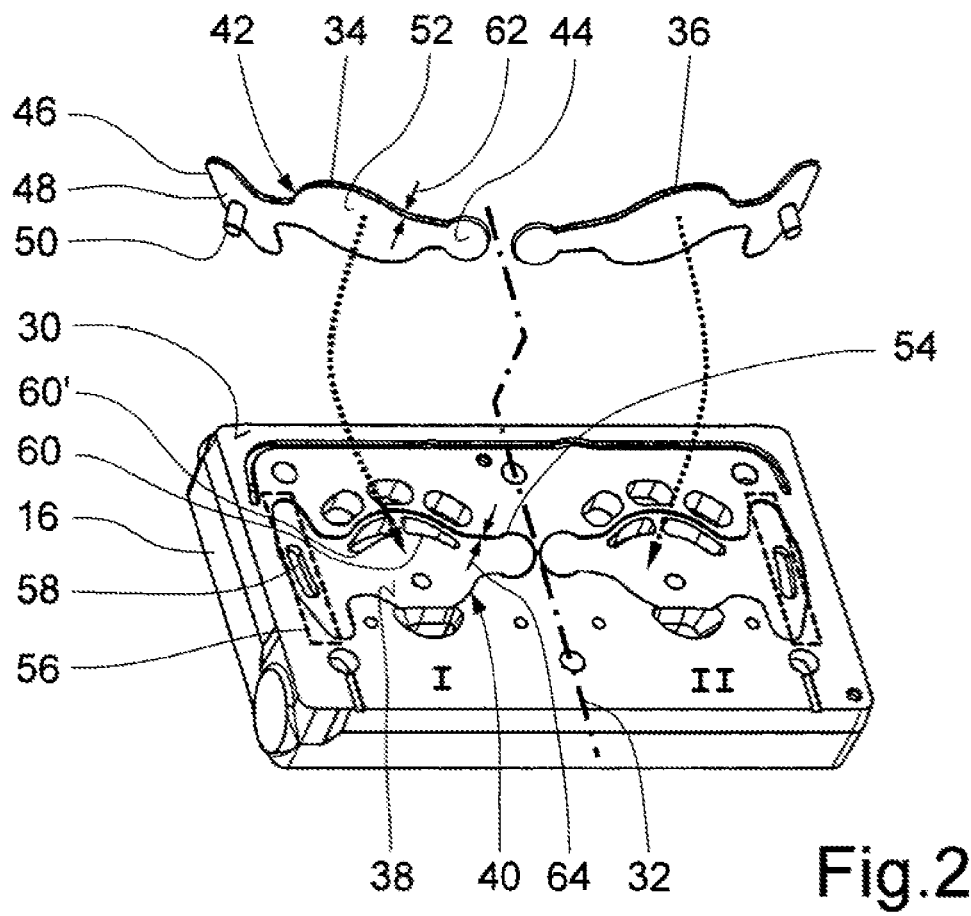
FIG. 2 shows a perspective top view of the underside of the cylinder head of the compressor of FIG. 1 together with two lamellas shown lifted away from the underside.

FIG. 2 shows a perspective view of the underside 30 of the cylinder head 16 facing the compressor pistons of the compressor 10, together with two lamellas 34, 36 shown lifted away therefrom. The underside 30 of the cylinder head 16 is divided into two regions I, II which are configured mirror-symmetrically to an axis of symmetry 32 together with all bores, channels, pins and recesses. The same applies to the two plate-like lamellas 34, 36 shown lifted away from the underside 30, so to avoid repetition, in the description which follows only region I of the underside 30 and the associated lamella 34 will be described.

A depression 38 with a closed peripheral contour 40 is formed, inter alia, in the underside 30 of the cylinder head 16, in its region I. The geometric course of the peripheral contour 40 corresponds here approximately to the peripheral contour 42 of the lamella 34. To allow flush reception of the lamella 34 in the depression 38 and simultaneously its pivotability within the area of the depression 38 defined by the peripheral contour 40, the peripheral contour 40 of the depression 38 is enlarged in comparison with the peripheral contour 42 of the lamella 34, transversely to the longitudinal extension of the lamella 34.

The lamella 34 has a bearing end 44 and, at an actuating end 46 directed away therefrom, an actuating portion 48 with a cylindrical actuating pin 50 which are connected together via a valve portion 52 which is bulbous or arcuate on both sides. The lamella 34 is pivotably mounted within the depression 38 of the cylinder head 16 by means of the bearing end 44, which can be inserted with at least partial form fit in a circle-segment shaped bearing contour 54 of the peripheral contour 40 of the depression 38, and there—in collaboration therewith—defines a pivot point for a pivot movement of the lamella 34.

The lamella 34 is pivoted as a function of an operating state of the compressor 10, in particular unloaded running with minimum air delivery quantity and full load operation with maximum air delivery quantity, by means of an actuator 56 indicated with a dotted line, which is arranged above the underside 30 of the cylinder head 16 in a bore (not shown) and is configured as a pneumatic piston-cylinder arrangement. To this end, the actuating pin 50 of the lamella 34, in fitted state thereof, reaches through an arcuate recess 58 in the cylinder head 16 and comes into engagement with an annular groove (not shown) of the piston of the actuator 56.

The pivoting of the lamella 34 within the depression 38 causes either the at least partial exposure or the complete covering of two control channels 60, 60' in the cylinder head 16, wherein due to the opening of the control channels 60, 60', for example a so-called dead space can be connected to the associated cylinder chamber of the compressor 10 and as a result the working volume increased, which in turn leads to a significant reduction in the drive power of the compressor 10 necessary for unloaded running.

In the case of the two compressor pistons given here, which preferably oscillate up and down in opposition in the cylinder chambers of the compressor 10, said cylinder chambers may be connected together via the control channels 60, 60' by means of the lamella 34, so that on unloaded running of the compressor 10, the air is conveyed to and fro between the two cylinder chambers with practically no loss, and the drive power still required when the compressor 10 is running unloaded is drastically reduced.

The material thickness 62 of the lamella 34 is dimensioned such that this is smaller than the depth 64 of the depression 38 in the cylinder head 16, in order in particular to guarantee a free movability of the lamella 34 after assembly of the cylinder head 16.

Furthermore, a plurality of further bores, channels, openings, recesses and pins is configured or arranged in the cylinder head 16 which are not essential to the understanding of the invention.

Figure 3:
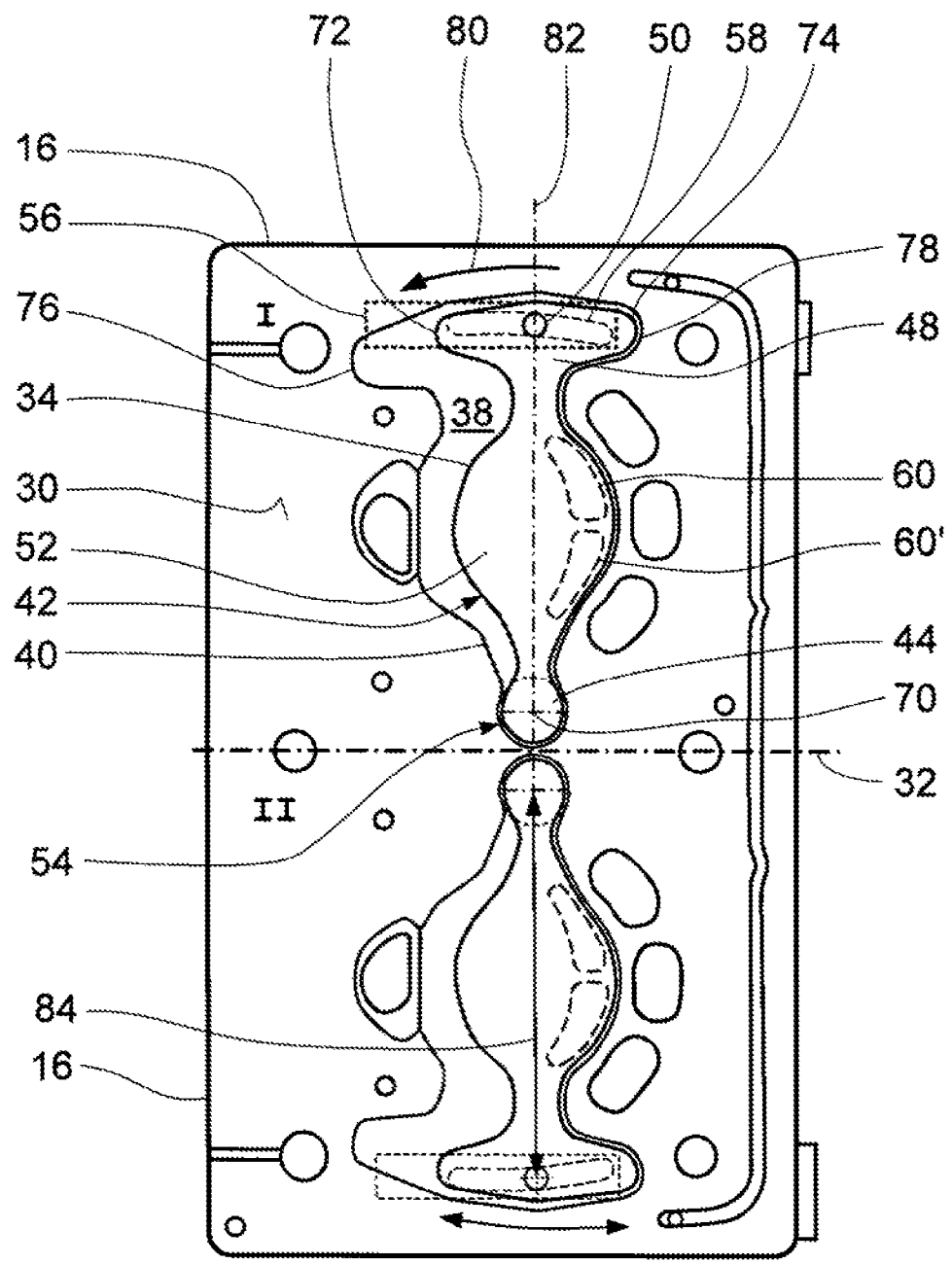
FIG. 3 shows a top view of the underside of the cylinder head in FIG. 2 with inserted lamella arranged in the loaded running operating position.

FIG. 3 shows a top view of the underside 30 of the cylinder head 16 of FIG. 2 with the lamella 34, 36 inserted and pivoted into its loaded running operating position. Because of the symmetrical structure of the underside 30 of the cylinder head 16 relative to the symmetry line 32, in the description below only the region I of the underside 30 is described in detail. In the position shown here, the lamella 34 is in its loaded running operating position, in which the arcuate valve portion 52 completely covers the two control channels 60, 60' indicated with dotted lines, and the compressor 10 therefore emits the maximum possible delivery quantity of compressed air.

The bearing end 44 of the lamella 34 is formed substantially circular and can be received pivotably by at least partial form fit in the similarly approximately circular bearing contour 54 of the depression 38, to create a pivot point 70. The bearing contour 54 constitutes a part portion of the peripheral contour 40 of the depression 38. The pivot point 70 acts instead of a bearing journal which would otherwise be required in this region for pivotable mounting of the lamella 34 of the cylinder head 16. The result is a substantially simplified structural design of the cylinder head 16. Due to the pivot point 70, the pivotable mounting of the lamella 34 within the depression 38 is guaranteed against mechanical loads acting parallel to the underside 30. By deviation from the exemplary embodiment shown here, the bearing end 44 of the lamella 34 may have a geometric form deviating from a circle, and may be configured for example as a polygon, for example a star or similar, with a reduction of the bearing surface available.

In this exemplary embodiment, the actuating portion 48 of the lamella 34 is formed approximately T-shaped and comprises two approximately semicircular leg ends 72, 74 arranged opposite each other. The abovementioned cylindrical actuating pin 50 is attached to the lamella 34 centrally between the first leg end 72 and the second leg end 74, for example by pressing, gluing, riveting, welding or similar. The two leg ends 72, 74, in cooperation with also approximately semicircular pockets 76, 78 formed in the peripheral contour 40 of the depression 38 in a manner which corresponds to the leg ends 72, 74, establish two defined end positions of the lamella 34 within the depression 38. In the pivot position of the lamella 34 shown, the second leg end 74 lies in its assigned second pocket 78, thus defining the loaded running operating position of the lamella 34 shown. Said actuator 56, with the end positions of its axial adjustment movement, determines the two end positions of the pivot movement of the lamella 34.

Figure 4:
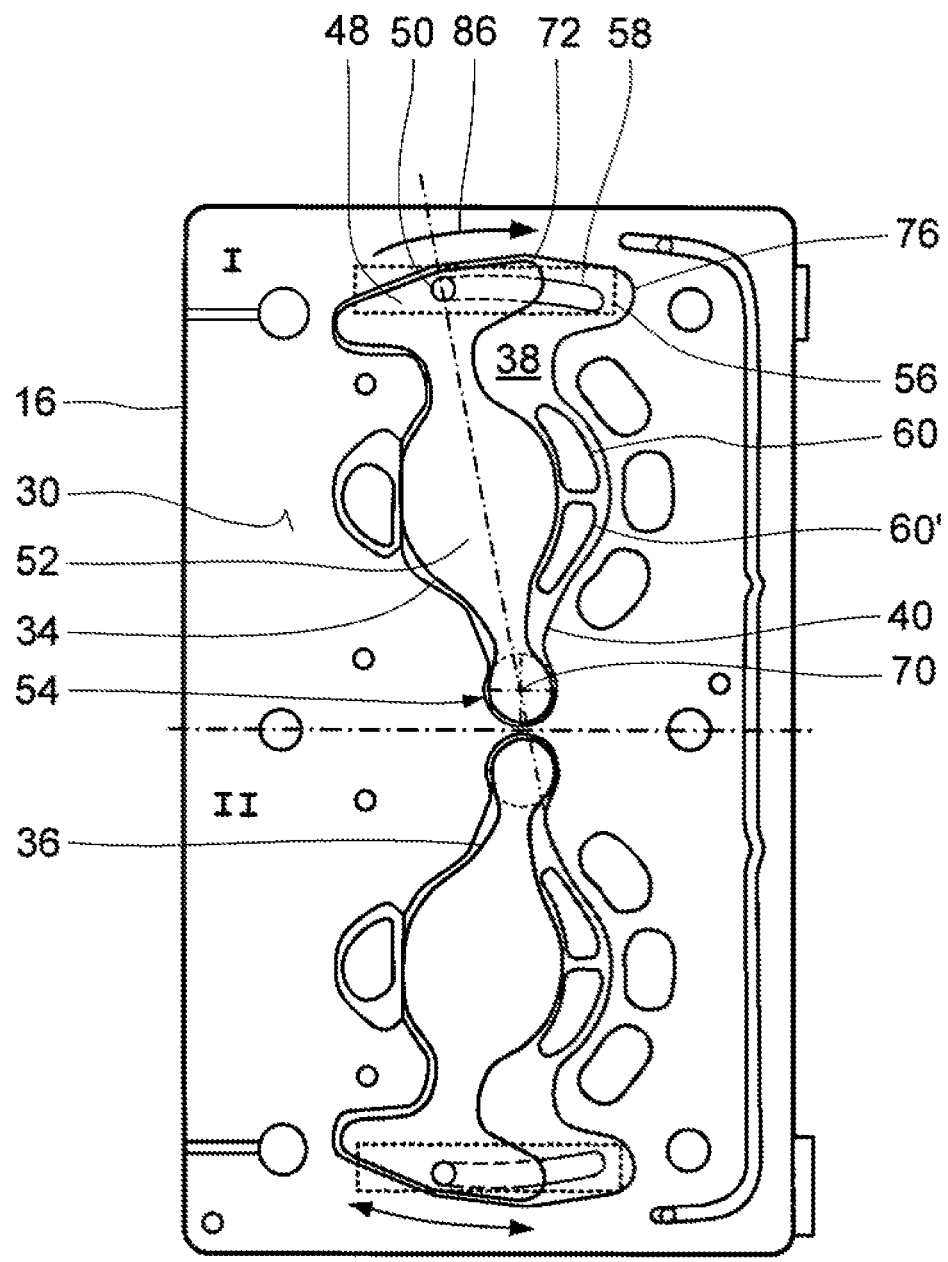
FIG. 4 shows a top view of the underside of the cylinder head in FIG. 2 with inserted lamella arranged in the unloaded running operating position.

In order to bring the compressor 10, starting from the loaded running operating position shown in FIG. 3, to the low-loss unloaded running operating position, the lamella 34 is pivoted by means of the actuator 56, the movable element of which is engaged with the actuating pin 50, about the pivot point 70 in the direction of an arrow 80 until the first leg end 72 comes approximately to rest in its assigned first pocket 76 and the arcuate valve portion 52 ideally completely exposes the control channels 60 (see FIG. 4). To allow the necessary mechanical coupling between the actuator 56 and the actuating pin 50 of the lamella 34, the cylinder head 16 has the arcuate recess 58 in the region of the semicircular pockets 76, 78. The mechanical connection between the actuating pin 50 of the lamella 34 and the actuator 56 may take place for example via an annular groove produced in its piston, in which the actuating pin 50 engages. In this way, the mechanical coupling between the actuator 56 and the actuating pin 50 is guaranteed independently of any rotational movements of the actuator 56 about its longitudinal center axis, which inter alia facilitates the mounting of the cylinder head 16.

In this exemplary embodiment, the lamella 34 is formed symmetrical to its longitudinal center axis 82, wherein the actuating portion 48, the valve portion 42 and the bearing end 44 are formed behind each other and symmetrically relative to the longitudinal center axis 82. In addition, the actuating pin 50 and the pivot point 70 are also spaced from each other by a distance 84 on the longitudinal center axis 82.

The geometry of the peripheral contour 40 of the depression 38 substantially corresponds to the peripheral contour 42 of the lamella 34, wherein however the transverse extension of the peripheral contour 40 of the depression 38 is extended disproportionately in comparison with the transverse extension of the peripheral contour 42 of the lamella 34 relative to the longitudinal center axis 82. This guarantees that the lamella 34 is received completely in the depression 38 of the cylinder head 16 in both its unloaded running operating position and in its loaded running operating position.

The peripheral contour 40 of the depression 38 and the peripheral contour 42 of the lamella 34 may be formed differently from the exemplary embodiment shown, as long as the desired control or regulation effect of the lamella 34 is achieved for switching between the unloaded running operating position and the loaded running operating position of the compressor 10 by covering and exposing again the control channels 60, 60', and in particular the lamella 34 is completely received in the depression 38 in both its pivot positions.

FIG. 4 also shows a top view of the underside 30 of the cylinder head 16 of FIG. 2 with the lamellas 34, 36 inserted and in an unloaded running operating position. The depiction of FIG. 4 largely corresponds to the depiction of FIG. 3, wherein however in contrast to the loaded running operating position shown in FIG. 3, the lamella 34 is here arranged pivoted into the unloaded running operating position in which the control channels 60, 60' emerging from the underside 30 of the cylinder head 16 are fully exposed by the arcuate valve portion 52 of the lamella 34. In this way, via the control channels 60, 60', a pneumatic connection is created between the two cylinder chambers provided here with the compressor pistons moving in opposition, or at least a dead space of suitable size is created, whereby the power consumption of the compressor 10 in its unloaded running mode is greatly reduced.

In order to return the lamella 34 from the unloaded running operating position shown here to the loaded running operating position in FIG. 3, the lamella 34 received pivotably in the bearing contour 54 of the depression 38 is pivoted back by the actuator 56 in the direction of arrow 86 until the second leg end 72 of the actuating portion 48 of the lamella 34 again rests approximately and at least partly in the second pocket 76 defined on the peripheral contour 40 of the depression 38.

While the above description constitutes the preferred embodiments of the present invention, it will be appreciated that the invention is susceptible to modification, variation and change without departing from the proper scope and fair meaning of the accompanying claims.

What is claimed is:

1. A compressor (10) for compressing air for a compressed air system of a motor vehicle, the compressor comprising
    a cylinder housing (14),
    a cylinder head (16) connected thereto,
    at least one cylinder in the cylinder housing (14),
    at least one compressor piston moveable in oscillation up and down in the at least one cylinder in the cylinder housing (14), and at least one lamella (34, 36) received in at least one depression (38) in an underside (30) of the cylinder head (16) facing the at least one compressor piston, wherein a delivery rate of the compressor (10) is regulated with little loss by closing or opening at least one control channel (60, 60') in the cylinder head (16) via the at least one lamella, and wherein the at least one lamella (34, 36) has a bearing end (44) hinged in a pivotably guided manner on a bearing contour (54) of the depression (38).

2. The compressor according to claim 1, wherein the bearing end (44) of the at least one lamella (34, 36) and the bearing contour (54) of the at least one depression (38) in the cylinder head (16) are formed at least partially circular.

3. The compressor according to claim 1, wherein the bearing end (44) of the at least one lamella (34, 36) and the bearing contour (54) of the at least one depression (38) of the cylinder head (16) engage in each other by form fit at least locally.

4. The compressor according to claim 1, wherein the at least one lamella (34, 36) comprises an actuating portion (48) at an actuating end (46) directed away from the bearing end (44).

5. The compressor according to claim 4, wherein the actuating portion (48) is formed approximately T-shaped and comprises two approximately semicircular leg ends (72, 74) arranged opposite each other at the short T-legs, and wherein an actuating pin (50) for mechanical coupling to an actuator (56) is formed or attached approximately centrally between the two leg ends (72, 74).

6. The compressor according to claim 5, wherein the bearing end (44) and the actuating portion (48) of the at least one lamella (34, 36) are connected together via a valve portion (52) which is arcuate on both sides.

7. The compressor according to claim 1, wherein in an unloaded running operating position of the at least one lamella (34, 36), a valve portion (52) of the at least one lamella (34, 36) at least partially opens the at least one control channel (60, 60') in the cylinder head (16).

8. The compressor according to claim 1, wherein in a loaded running operating position of the at least one lamella (34, 36), a valve portion (52) of the at least one lamella (34, 36) completely closes the at least one control channel (60, 60').

9. The compressor according to claim 1, wherein the at least one lamella (34, 36) has a material thickness (62) that is approximately constant across the entire at least one lamella, and wherein the material thickness (62) is smaller than a depth (64) of the at least one depression (38) in the underside (30) of the cylinder head (16).

* * * * *